C. A. JOHNSON AND J. P. CARRUTHERS.
PRIMING DEVICE.
APPLICATION FILED JULY 24, 1920.

1,399,625.

Patented Dec. 6, 1921.
2 SHEETS—SHEET 1.

C. A. Johnson and
J. P. Carruthers.
INVENTOR

BY Victor J. Evans
ATTORNEY

C. A. JOHNSON AND J. P. CARRUTHERS.
PRIMING DEVICE.
APPLICATION FILED JULY 24, 1920.

1,399,625.

Patented Dec. 6, 1921.
2 SHEETS—SHEET 2.

C. A. Johnson and
J. P. Carruthers
INVENTOR

Victor J. Evans
ATTORNEY

WITNESS:

UNITED STATES PATENT OFFICE.

CHRISTIAN A. JOHNSON AND JESSE P. CARRUTHERS, OF DENVER, COLORADO.

PRIMING DEVICE.

1,399,625. Specification of Letters Patent. Patented Dec. 6, 1921.

Application filed July 24, 1920. Serial No. 398,660.

*To all whom it may concern:*

Be it known that we, CHRISTIAN A. JOHNSON and JESSE P. CARRUTHERS, citizens of the United States, residing at Denver, in the county of Denver and State of Colorado, have invented new and useful Improvements in Priming Devices, of which the following is a specification.

This invention relates to carbureting devices and has for its object the provision of an auxiliary carbureting device adapted for association with the intake manifold of an internal combustion engine, for the purpose of priming the engine for facilitating starting in cold weather.

An important object is the provision of a device of this character which is so constructed that it may be operated from the dash of the automobile so as to permit a rich mixture to be drawn into the engine cylinders when the engine is turned over by the starter or manually, so as to constitute a priming device, the device being also adapted for use as a gasolene saver.

A further object is the provision of a device of this character which is adjustable in every particular so as to vary the quantities and proportions of gasolene and air admitted to the manifold.

An additional object is the provision of a device of this character which will be comparatively simple and inexpensive in manufacture, easy to install, efficient in action, durable in service, and a general improvement in the art.

With the above and other objects and advantages in view, the invention consists in the details of construction to be hereinafter more fully described and claimed, and illustrated in the accompanying drawings in which—

Figure 1:
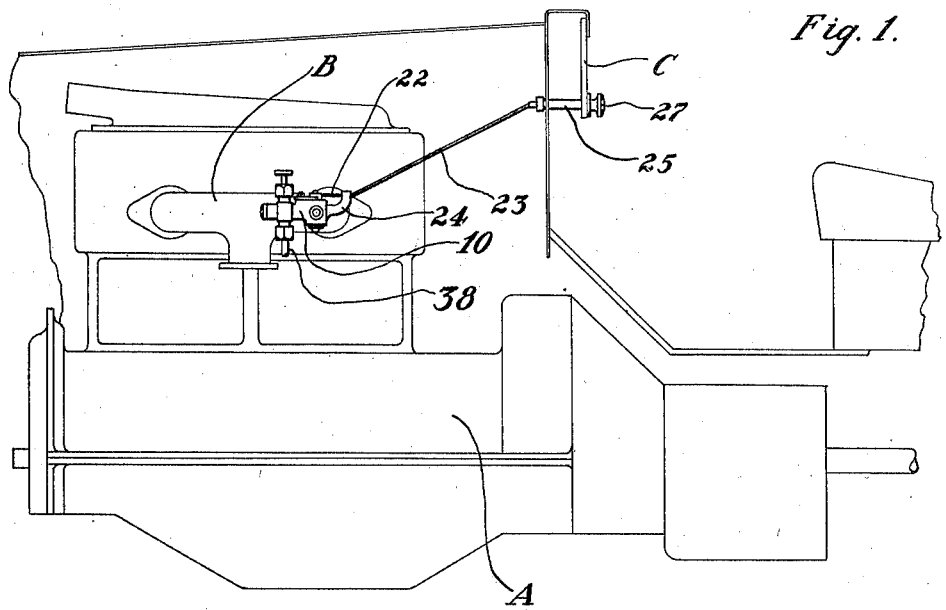
Figure 2:
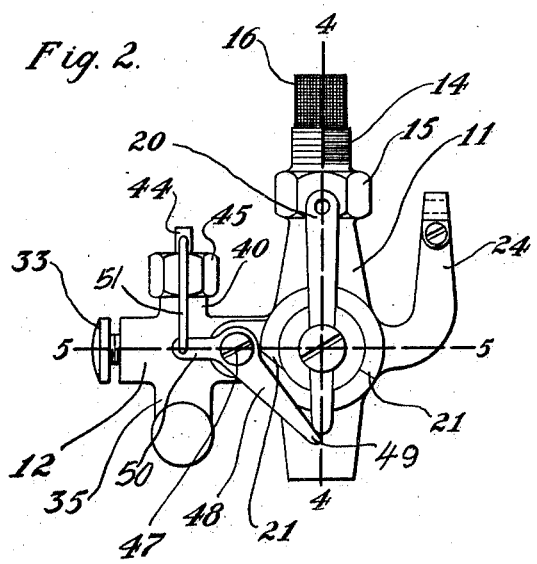
Figure 4:
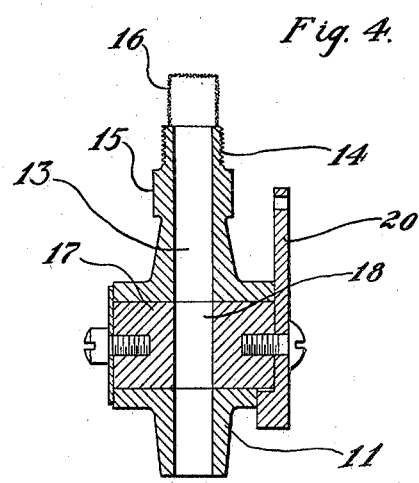
Figure 3:
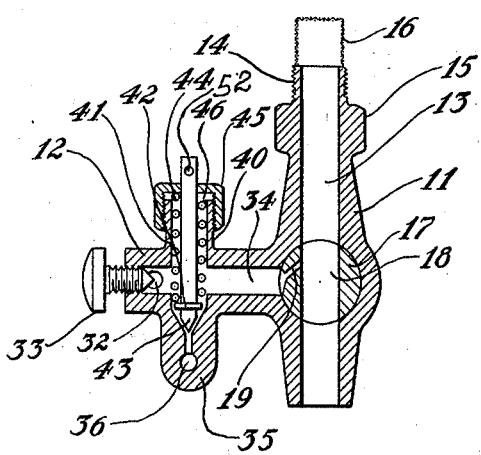
Figure 5:
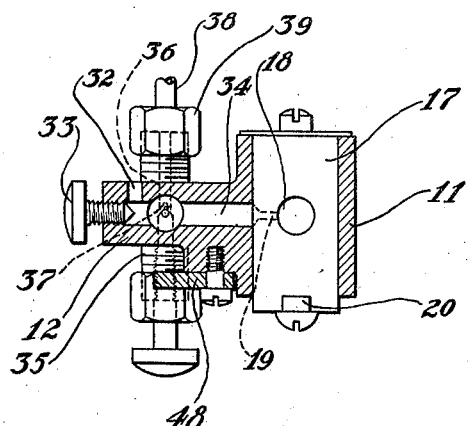
Figure 6:
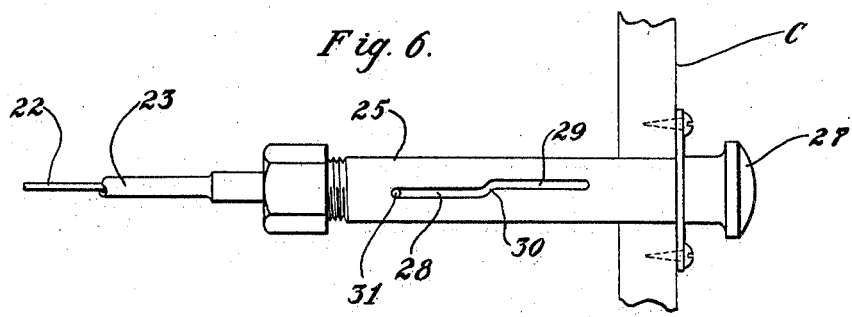
Figure 7:
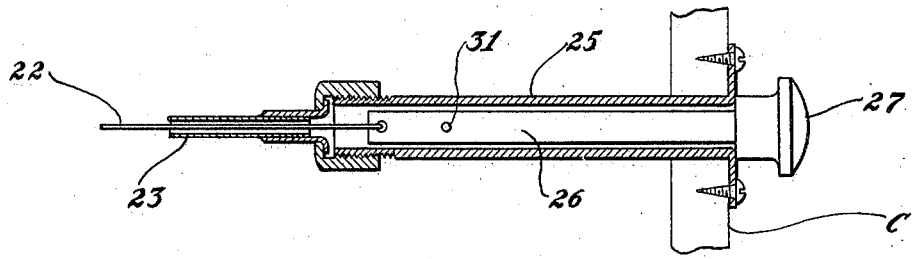

Figure 1 is a somewhat diagrammatic view of an automobile engine showing our device associated therewith and showing the dash control means, Fig. 2 is a plan view of the device, Fig. 3 is a horizontal sectional view, Fig. 4 is a longitudinal sectional view on the line 4—4 of Fig. 2, Fig. 5 is a sectional view on the line 5—5 of Fig. 2, Fig. 6 is an enlarged side elevation of the control means on the dash, and Fig. 7 is a longitudinal section therethrough.

Referring more particularly to the drawings, the letter A designates an internal combustion engine of an automobile, B designates the intake manifold, and C designates the dash.

In carrying out our invention we provide a device which comprises a casing 10 including a relatively long portion 11 and a portion 12 extending at right angles thereto. The casing portion 11 is provided with a longitudinal bore 13, one end of which is open to the atmosphere and constitutes an air inlet and the other of which is threaded, as shown at 14, for engagement with a suitable hole drilled in the intake manifold B, the casing being provided with an angular portion 15 facilitating its engagement by a wrench. The extremity of the casing extending into the manifold carries a screen 16 of extremely fine mesh which is for the purpose of breaking up gasolene vapor passing into the manifold, as will be hereinafter described.

Extending through the casing 10 at the juncture of the portions 11 and 12, is a rotatable plug valve 17 having a transverse passage 18 and having a relatively small passage 19 extending from its periphery into the passage 18. Above the casing the valve 17 has secured thereto a lever 20 which is engageable with shoulders 21 formed on the casing for limiting its movement in either direction. Connected with one end of the lever 20 is a flexible member 22 which may be a cord or wire and which extends through a guide tube 23 having one end secured by a bracket 24 and its other end secured to a tube 25 passing through the dash C.

The wire is secured to a plunger 26 slidable within the tube 25 and carrying a knurled head 27. The tube 25 is provided with slots 28 and 29 having a heel or shoulder 30 at their point of connection, and the plunger has a lateral pin 31 operating within the slots.

Adjacent its free end portion the casing portion 12 is provided with an air inlet opening 32 and threaded into its extremity is a screw 33 which is movable into or out of the bore 34 of the casing portion 12 for regulating the passage of air through the opening 32.

Formed upon one side of the portion 12 of the casing is an enlargement or projection 35 which is formed with a passage 36 which is right angular in shape and which has one end leading to the top of the projection and its other end leading into the bore 34. This latter mentioned end is enlarged and formed tapered to constitute a valve seat 37. A gasolene conducting pipe 38 leads into the top of the passage 36 and is secured to the projection 35 by the usual connection 39.

Formed on the portion 12 of the casing opposite the projection 34, is a projection 40 having a bore 41 extending therethrough and communicating with the bore 34. Slidable within the bore 41 is a needle valve 42 which has one end tapered, as shown at 43, for conforming engagement with the seat 37 and which is provided at its other end with a reduced stem 44 slidable through a cap 45 screwed onto the projection 40. A coil spring 46 surrounds the stem 44 and abuts against the valve 42 and the cap 45 for normally holding the valve in closed position.

Pivoted upon the top of the casing portion 12, as shown at 47, is an angle lever 48 which has one arm 49 engageable by the lever 20 and which has its other arm 50 connected with a rod 51 which has its other end down-turned and engaged within a hole 52 in the projecting end of the stem 44.

The operation of the device is as follows:

Under ordinary conditions, that is when the use of the device is not desired, the lever 20 and the plug valve 17 are in such position that the passage 17 in the valve will be out of registration with the bore 13. The plunger 26 is then in such position that the pin 31 is at the inner end of the slot 28. When it is desired to prime the engine, the operator pulls upon the head 27 to bring the pin 31 to the shoulder 30, turns the head slightly, and then pulls to bring the pin to the end of the slot 29. This pulls upon the flexible member 22 whereupon the lever 20 will be moved and the plug valve 17 rotated to bring the passage 18 therein in registration with the bore 13 and to bring the passage 19 into registration with the bore 34. At the same time this movement of the lever 20 results in swinging movement of the angle lever 48 and as this angle lever is moved the rod 51 connected with the valve stem 44 will move the valve stem and consequently the valve 42, outwardly against the resistance of the spring 46 and the valve will, of course, be disengaged from its seat 37. When the engine is being turned over, either by the starter or manually, the suction produced in the cylinders will of course produce suction through the intake manifold and within the casing of our device. Air will enter the device through the opening 32 and gasolene will enter from the pipe 38 through the passage 36 and the air and gasolene will then pass through the bore 34 and passage 19 into the bore 13 and through the screen 16 into the manifold, thus delivering a rich mixture to the engine. It is of course apparent that more air will be sucked in through the open end of the bore 13. When the engine is started, it is merely necessary that the operator shove the plunger into the tube as far as possible to release his pull upon the wire 22, whereupon the spring 46 will close the valve 42 and will return the angle lever 48 and consequently the lever 20 to their initial positions.

When desired, the device may be used as a gasolene saver by pulling upon the head and withdrawing the plunger 26 until the pin moves along the slot 28 and engages with the heel or shoulder 30. The air valve will then be opened slightly and be held open so that air will mix with and efficiently break up the gasolene vapor so as to form a more highly explosive mixture which will give added power and speed to the engine.

From the foregoing description and a study of the drawings it will be apparent that we have thus provided a simply constructed and easily operated device for priming an automobile engine or in fact any other engine using liquid fuel, in a very efficient and thorough manner so as to facilitate starting, particularly in cold weather. It will be observed that the device has its parts adjustable to adapt it for use on engines of different types. It will also be apparent that the device is an efficient gas economizer and is also an auxiliary carbureter.

While we have shown and described the preferred embodiment of our invention, it is of course to be understood that we reserve the right to make such changes in the form, construction, and arrangement of parts as will not depart from the spirit of the invention or the scope of the subjoined claims.

Having thus described our invention, we claim:

1. An auxiliary priming device comprising a casing including a main portion adapted to be threaded into an intake manifold of an engine and including portions arranged at right angles and each having a bore extending to the end thereof, the extremity of one portion extending into the manifold carrying a screen of fine mesh, a rotatable plug disposed at the juncture of said casing portions and having passages adapted to register with the bores therein, a lever secured to said plug whereby to rotate the same, the other casing portion being formed with a gasolene inlet passage terminating in a valve seat and being provided with an air inlet opening, a valve slidably mounted and adapted to engage said seat, and means connected with said lever whereby to move said valve.

2. An auxiliary priming device comprising a casing including a main portion adapted to be threaded into the intake manifold of an engine and including portions arranged at right angles and each having a bore extending to the end thereof, the extremity of one portion extending into the manifold carrying a screen of fine mesh, a rotatable plug disposed at the juncture of said casing portions and having passages adapted to register with the bores therein, a lever secured to said plug whereby to rotate the same, the other casing portion being formed with a gasolene inlet passage terminating in a valve seat and being provided with an aid inlet opening, a valve slidably mounted and adapted to engage said seat, and means connected with said lever whereby to move said valve, said means comprising an angle lever pivoted upon the casing and having one arm abuttingly engaging said lever and its other arm connected with said valve.

3. A device of the character described comprising a casing including portions extending at right angles to each other, one portion being adapted for connection with the intake manifold of an engine, both portions being provided with communicating bores, a rotatable plug disposed at the juncture of said casing portions and having passages adapted to register with the bores thereof, the other casing portion being provided in one side with an air inlet opening and provided at its end with means for regulating the size of the opening, said second named portion being provided at one side with an enlargement having a gasolene inlet passage formed therein, the passage leading into the associated bore and formed to provide a valve seat, said second named portion being provided at its opposite side with a projection, a valve adapted to close said seat and having a stem slidable through said projection, and means for simultaneously rotating said plug and unseating said valve.

4. A device of the character described comprising a casing including portions extending at right angles to each other, one portion being adapted for connection with the intake manifold of an engine, both portions being provided with communicating bores, a rotatable plug disposed at the juncture of said casing portions and having passages adapted to register with the bores thereof, the other casing portion being provided in one side with an air inlet opening and provided at its end with means for regulating the size of the opening, said second named portion being provided at one side with an enlargement having a gasolene inlet passage formed therein, the passage leading into the associated bore and formed to provide a valve seat, said second named portion being provided at its opposite side with a projection, a valve adapted to close said seat and having a stem slidable through said projection, and means for simultaneously rotating said plug and unseating said valve, said means comprising a lever secured to the plug, an angle lever pivoted upon the casing and having one arm engaged by said lever, and a rod connected with the other arm of the angle lever and connected with said stem.

5. An anxiliary priming device comprising a casing including a main portion adapted to be threaded into an intake manifold of an engine and including portions arranged at right angles and each having a bore extending to the end thereof, the extremity of one portion extending into the manifold carrying a screen of fine mesh, a rotatable plug disposed at the juncture of said casing portions and having passages adapted to register with the bores therein, a lever secured to said plug whereby to rotate the same, the other casing portion being formed with a gasolene inlet passage terminating in a valve seat and being provided with an air inlet opening, a valve slidably mounted and adapted to engage said seat, and means connected with said lever whereby to move said valve comprising a plunger slidably mounted on the dash, and a flexible member connected with said lever and said dash.

6. An auxiliary priming device comprising a casing including a main portion adapted to be threaded into an intake manifold of an engine and including portions arranged at right angles and each having a bore extending to the end thereof, the extremity of one portion extending into the manifold carrying a screen of fine mesh, a rotatable plug disposed at the juncture of said casing portions and having passages adapted to register with the bores therein, a lever secured to said plug whereby to rotate the same, the other casing portion being formed with a gasolene inlet passage terminating in a valve seat and being provided with an air inlet opening, a valve slidably mounted and adapted to engage said seat, and means connected with said lever whereby to move said valve comprising a tubular member secured through the dash, a plunger slidable within said tubular member and connected with said lever, and means for holding said plunger at selected positions.

In testimony whereof we affix our signatures.

CHRISTIAN A. JOHNSON.
JESSE P. CARRUTHERS.